May 12, 1931.    C. H. SCHEU    1,805,264
ATTACHING MEANS FOR REMOVABLE DENTURES
Filed Dec. 1, 1927
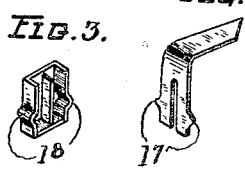
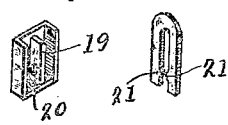
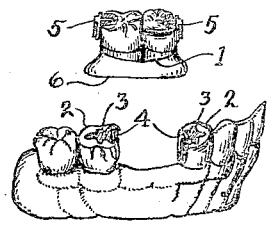
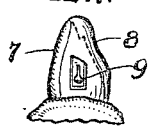
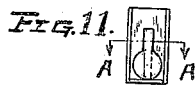
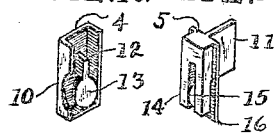
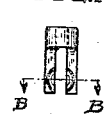
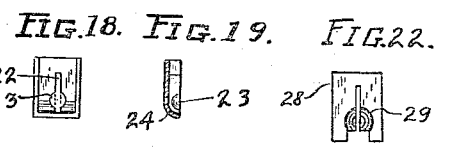
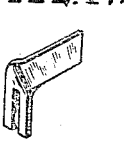
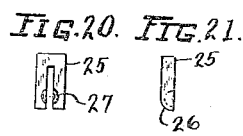
Inventor
Carl H. Scheu
By Edmund J. Te Pas
Attorney Patented May 12, 1931

1,805,264

UNITED STATES PATENT OFFICE

CARL H. SCHEU, OF LAKEWOOD, OHIO

ATTACHING MEANS FOR REMOVABLE DENTURES

Application filed December 1, 1927. Serial No. 236,911.

My invention relates to dentistry, and in particular, attaching means for removable dentures of bridgework.

It has always been a problem in attachments of this type, to have adequate retention without binding. Of the attachments with which I am familiar, and of those which are marketed by the dental supply companies in this country, the achievement of this result is sought by the use of various kinds of spring tensioning means to provide frictional engagement between the removable and fixed elements of the attachment.

Such attachments, by reason of their relatively large size, usually necessitate the removal of a large portion of the natural teeth, which are used to carry the attachments, and it is often impossible to properly secure them to the smaller anterior teeth.

In many cases, the female portion of the attachment, which is usually mounted on the live tooth, is of such shape as to form a trap for the collection and retention of food particles that cannot be removed by the usual brushing or cleaning of the teeth. This leads to a very undesirable oral condition, and defeats one of the main objects of the removable denture, namely, that of sanitation.

Again, when there is sufficient spring tension to safely hold the attachment in place, it may be difficult to insert and remove, and may have no allowance for compensating movements.

It is an object of my invention to provide a dental attaching device, which may be cheaply constructed, and which will serve to secure and hold the removable denture in place.

Another object of my invention is to provide a dental securing device, that consists essentially of an interlocking spring snap, the stationary and and removable elements of which are adapted to be applied to opposing or opposite parts of the denture.

Another object of my invention is to provide an attachment for securing artificial teeth in position, in such manner, that the denture cannot be accidentally displaced, and that may be readily removed for cleaning and sterilizing.

Another object of my invention is to provide means, whereby the stress and strains applied to the denture are transmitted by a resilient element, whereby the abutment tooth is properly protected.

Another object of my invention is to provide a construction of the character described, that provides a small compact and very strong fastening, adapted to occupy a minimum space between the abutment teeth, and the tooth or teeth to be replaced.

Another object of my invention is to provide a dental fastening for bridges, or removable plates, that will have limited movement during mastication, without straining or breaking the joint between the fastening elements or their respective connections with the abutment teeth, and the bridge or partial plate.

Another object of my invention is to provide a dental fastening for removable bridge or partial plates, so designed as to permit a limited spring resisted movement to take care of the normal play between the fixed abutment and the removable attachment.

Another object of my invention is to provide a dental fastening for a bridge or partial plates, so constructed, that wear between the fixed and removable element may be taken up by bending one of the elements.

Another object of my invention is to provide a dental fastening for the abutment tooth, which may be placed close to the occlusal surface of the tooth, and away from the gum, so that food will not collect between the fastening and the gum.

Another object of my invention is to provide a dental fastening, in which the stationary or abutment tooth member can be made small enough for an attachment to canine and incisor teeth.

A further object of my invention is to provide a dental device, in which the stationary or abutment tooth member requires a very small inlay preparation for its application, and which may be easily and thoroughly cleaned by the ordinary methods.

My improved attachment consists, essentially, of a snap or spring catch locking device, one member of which is adapted to be secured to a removable denture or bridge, and the other to a natural or live tooth, forming the stationary or abutment tooth.

This attachment may be made very small, and still have sufficient strength to accomplish its purpose. It is easily cleaned and sanitary. Only a minimum grinding of the natural tooth is required for its application. By reason of its small size, it can be successfully used on anterior teeth, such as canine and incisor teeth. It is not apt to become dislodged during mastication. It can readily be adapted to long and short bites. It allows for compensating movement to prevent torsional stresses on the supporting or abutment teeth. It is not apt to become wedged or jammed in the act of removal or replacement, and it is simple and inexpensive to manufacture.

In the accompanying drawings:

Figure 1 is a perspective view of the right hand half of a lower jaw, with one form of my improved attachment arranged thereon.

Figure 2 is a similar view of the same jaw, with the removable and fixed parts of the attachment separated from each other.

Figure 3 and Figure 4 are perspective views showing the female and male members respectively, of one form of my improved dental attaching means.

Figures 5 and 6 are perspective views showing the female and male elements respectively, another form of my improved dental attaching means.

Figure 7 is a side view of canine or eyeteeth showing the female element of the attachment secured to a three-quarter crown.

Figure 8 is a plan view of the tooth shown in Figure 7.

Figures 9 and 10 are perspective views, showing another form of the complementary elements of my improved attachment.

Figure 11 is an end view of Figure 10.

Figure 12 is a section taken on line AA Figure 11.

Figure 13 is another form of the male element or spring clasp of my improved attachment.

Figure 14 is an end view of the element shown in perspective in Figure 13.

Figure 15 is a section taken on line BB Figure 14.

Figure 16 is a perspective view of another form of spring clasp.

Figure 17 is a perspective view of another form of spring clasp.

Figure 18 is a side view of another form of the female element of my improved attachment.

Figure 19 is an end view of the element shown in Figure 18 with one side of the box cut away.

Figure 20 is a side view of the spring clasp or complementary male element for the female element shown in Figure 18.

Figure 21 is an end view of the clasp shown in Figure 20.

Figure 22 is an enlarged side view of a modification of clasp shown in Figure 20, and adapted for use with the element shown in Figures 18 and 19.

In the use of my invention, a removable bridge 1, is attached to the abutment teeth 2, by means of an inlay 3, set therein, and a female element 4, is secured within the inlay, or to a crown over the abutment teeth, as may be best suited for the individual case. A spring clasp or complementary male element 5, is secured to the detachable bridge in any suitable manner, such as by hard soldering.

In fitting the attachment, the plate 6, of the bridge 1, is adjusted to make firm contact with the tissues above, and on the inner side of the alveolar ridge adjacent thereto, without however, any undue pressure, which would accelerate the absorption of the underlying bone and tissue.

It will be apparent from the illustrations, that the bridge may be readily removed and replaced by the wearer for cleaning and other purposes.

Due to the relatively small size in which this attachment can be made, it can be used on the smaller anterior teeth such as the canine and incisor teeth, and is not restricted to use on molars and bicuspids.

Figures 7 and 8 illustrate a canine or eyetooth with the female element of my improved attachment fitted thereon. Preparation of the canine tooth may be made by cutting away the enamel 7 of the crown of the tooth as shown in the dotted lines and fitting a three-quarter crown 8 over that portion of the tooth which was prepared for its reception. The female element 9, is secured by any suitable method, such as soldering, in a recess formed in the three-quarter crown, and is ground down to conform substantially to the original shape of the tooth.

Figures 9 to 12 inclusive, show a form of my invention, in which the complementary interlocking members of my improved attachment, comprise a female element 4, which consists of a shallow rectangular box, 10, that is open at its front and top sides. This box is provided with a guiding fin, 12, having formed thereon a conical enlargement 13, adjacent its lower end. The male element of the attachment consists of a resilient, spring-metal, U-shaped clamp or clasp, 14, which is hollowed out at 15, for the reception of the conical member 13. The upper end of the clamp 14, is attached by any suitable method, such as hard soldering, to a plate 16, which, in this instance, is provided with a vertical flange 11, for attachment to the removable bridge.

In many cases, the flange 11, may be dispensed with and the plate 16, soldered directly to the removable bridge. As bridges of this type are provided with a metal base upon which the porcelain artificial teeth are fixed, the metal base may be made so that it is only necessary to solder the U-shaped spring clamp to the bridge, when the ends of the bridge are provided with faces to take the place of the plate 16.

The complementary members of my improved attachment are preferably made of a precious or noble metal alloy having very great tensile strength, and the properties of a metal suitable for the construction of a spring.

It may be desirable, in some cases, to reverse the elements of the clamp or snap, by securing the male element to the abutment or natural teeth, and the female element to the removable bridge. This may be accomplished, in the same manner, as if the elements of the attachment were fitted in the manner illustrated in Figures 1 and 2, bearing in mind, however, that, when the elements are reversed, their position is also inverted with respect to their position as shown in the Figures 1 and 2.

In fabricating the male and female elements, these parts are so proportioned, that the finished attachment may be readily removed and replaced. The U-shaped spring, which is the male element of the clamp, must expand sufficiently in applying the attachment, so that the ends of the clamp pass the conical enlargement on the guiding fin of the female element, which is then received in a complementary depression on the inner face of the U-spring when the attachment is in position. By this arrangement, a snap fastener is provided, that securely holds the removable bridge in place, and which can be readily removed for cleaning and other purposes.

Figures 3 and 4 illustrate a modified form of the device, in which lateral extensions 17 formed on the sides of the male element or spring clamp, coact with the complementary indentations 18, formed in the sides of the box of the female element.

Figures 5 and 6 illustrate another modification of my invention, in which the guide fin 19, of the female element, is provided with a hole or recess 20, for reception of the inwardly extending portions 21, of the male element or spring clamp.

Figure 13 illustrates a modified form of fastener, in which the male element may be formed from a single piece of flat sheet metal, which is properly cut, and then bent to assume the shape shown in the drawings.

Figures 14 and 15 illustrate constructional details of the clamp shown in Figure 13, particularly, the depression for reception of the conical enlargement of the female element.

Figure 16 illustrates another form of clamp, which may be made from a single piece of sheet metal.

Figure 17 illustrates a form of clamp, suitable for use, when the clamp is carried on an artificial anterior bicuspid or an eyetooth, and the complementary element of the attachment is carried on a natural canine or an incisor tooth. This clamp may be made either in rights or lefts, depending upon the side of the mouth that they are to be used on, and it is adapted for reception in a female element, such as shown in Figures 7 and 8.

Figures 18 to 21 inclusive, illustrate a modification of the above attachments, that is suitable for use where there is but one abutment tooth. In this case a certain amount of movement must be provided for in the anchorage for the false teeth, which are secured to the natural teeth at but one end and are supported principally by the gums. The female element is formed with the lower portion 24 of its box cylindrical in outline. The axis of the box cylindrical portion 24, of the box, lies in a line passing through the center of the spherical enlargement 23, formed on the guide fin 22. The spring clamp or complementary male element 25, is rounded off at its lower portion 26 and is provided with spherical recess 27, for engagement with the sphere 23. Such an attachment would be of use where it is used to replace the three molars on one side of the jaw, either upper or lower. In this case, the adjacent bicuspid carries the female element of the attachment to which the plate carrying the artificial molars is anchored and partly supported thereby. The gums form the main support for an attachment of this type, and it is due to their yielding, when subjected to pressure, that a pivotal connection must be made with the abutment tooth.

Another form in which the male element of the attachment might be made, where it depends upon a single abutment tooth for anchorage, is that illustrated by Figure 22. In this instance, the male element 28, of the snap fastener, is constructed similarly to the element shown in Figures 20 and 21. The upper half of spherical recess 29, in this instance, is provided with a much narrower slot than the element shown in Figures 20 and 21. By this slight change, the spherical portion 23, of the female element, alone, provides the support for the removable bridge. Due to the fact that the male element 28, does not contact with the lower bottom portion 23, of the female element, it is not necessary to have this portion cylindrical in outline.

The bottom portion 24, may be dispensed with, if it is so desired. It is entirely feasible to dispense with the box entirely, using only the guide fin 22, and its spherical enlargement 23, for one element of my improved snap fastener.

It is apparent from the construction of my device, that the removable element may be made so that it is supported entirely by, either the bottom 24, the spherical enlargement 23, or the top of the fin 22, or the combination of any two of them, or the combination of all three of them. In the last mentioned case, the top of the fin 22, would have to be rounded in a manner similar to bottom portion 24, to allow for movement of the attachment.

I prefer to form the complementary elements of my improved attachment from a precious metal alloy of high tensile strength. If so desired, the female element could be formed integrally with the inlay or crown that is to carry it.

Another manner of using my improved attachment is to make a crown or inlay with a shallow rectangular depression in its side, and then solder the hard metal fin in this depression. In this case, the crown or inlay has the box portion of the female element formed integrally therein, and the guide fin and its locking enlargement, which are the parts most subject to wear, are made of a metal more resistant to wear, and then permanently attached to the softer crown or inlay.

Furthermore, it is to be understood, that the particular forms of apparatus shown and described, and the particular procedure set forth, are presented for purposes of explanation and illustration, and that various modifications of said apparatus and procedure can be made without departing from my invention as defined in the appended claims.

What I claim is:

1. A snap fastener for removable bridge work, comprising, a vertical fin, a transverse enlargement on said fin, means for securing said fin to a natural tooth, and a U-shaped spring having a recessed portion on one face bisected by the slot of said U-shaped spring, said U-shaped spring being adapted for co-operative engagement with said vertical fin, and said transverse enlargement on said fin.

2. In a dental attachment the combination of an element adapted to be supported by a natural tooth comprising, an open box, a fin having a transverse enlargement formed thereon carried in said box, and an element on an artificial tooth adapted to make detachable interlocking engagement with said first named element.

3. In a dental device, an element for a dental fastening adapted for securement to an artificial tooth embodying a slotted spring member having flexible portions extending downwardly from the point of securement of said member to the tooth, and a co-operating element adapted to be secured to a natural tooth having a part provided for reception in the slot of said spring member to make detachable interlocking engagement therewith.

4. A snap fastener for removable dentures comprising, a slotted resilient member adapted at its upper end for rigid securement to a tooth structure and having a recessed portion traversed by the slot of said member, and a complementary member having a fin secured thereto for the support of said resilient member and an enlargement formed on a portion of the edge of said fin adapted for detachable interlocking engagement with the recessed portion of said resilient member upon the distention thereof.

5. A snap fastener for removable dentures comprising, a resilient member having a longitudinal slot and a depression formed in one side of said member adjacent the slot thereof, and a complementary member for said resilient member comprising an open box, a fin carried in said box adapted for reception in said slot, and an enlargement formed on said fin adapted reception in said depression upon spreading of said resilient member.

6. In a dental device a snap fastener comprising, a rigid box-like member adapted to be positioned in the side of a tooth, a fin carried by said member, and a resilient member having a slot open at one end, said resilient member being rigidly secured to an artificial tooth at a point remote from its open end and adapted to receive said fin in said slot to provide a detachable support for an artificial tooth.

7. A detachable resilient anchorage for artificial teeth comprising, a resilient member secured to an artificial tooth, a box adapted for reception in a natural tooth said box being open at its top and at the side remote from said tooth, and means within said box co-operating with said resilient member to provide a rigid support for said artificial tooth for downwardly directed stresses and a resilient support for lateral and rocking movements of said artificial tooth.

8. A detachable resilient fastening means for artificial teeth comprising, a supporting element carried by a natural tooth, and a resilient member secured to an artificial tooth adapted to provide with said supporting element a rigid support for said artificial tooth for stresses applied thereto in a vertically downward direction and a resilient support for stresses applied thereto in all other directions, and means to limit the lateral and rocking movement of said artificial tooth.

9. A detachable resilient fastening means for artificial teeth comprising, a box open at its top and at one of its sides, a vertically aligned supporting member carried in said box, said box being carried in a natural tooth, and a resilient member secured to an artificial tooth adapted to provide with said supporting member a rigid support for said artificial tooth for stresses applied in one direction thereto and a resilient support for stresses applied in other directions thereto, the sides of said box co-operating with said resilient member to limit the extent of movement of said artificial tooth.

10. In a fastening means for a removable denture, a box-like member adapted to be positioned in the side of a tooth having a vertically arranged fin defining a pair of longitudinally disposed recesses, and a complementary member having portions adapted to be detachably received and supported in the recesses of said first named member.

11. In a fastening means for a removable denture, a member adapted to be positioned in the side of a tooth having a vertically arranged fin with an enlargement formed at its outer edge said fin defining a pair of longitudinally disposed recesses, and a complementary member adapted to be removably received in the recesses of said first named member.

12. In a fastening means for a removable denture, a member adapted to be positioned in the side of a tooth having a vertically arranged fin with a lateral enlargement adjacent the outer edge thereof said fin defining a pair of longitudinally disposed recesses, and a complementary member having relatively flexible portions adapted for detachable reception in the recesses of said first named member for engagement with said fin.

In testimony whereof I affix my signature.

CARL H. SCHEU.